United States Patent
Firebaugh et al.

(10) Patent No.: US 11,113,855 B2
(45) Date of Patent: Sep. 7, 2021

(54) EXPRESSION INTERPRETATION ENGINE FOR COMPUTER MAP VISUALIZATIONS

(71) Applicant: Mapbox, Inc., San Francisco, CA (US)

(72) Inventors: John Edward Firebaugh, San Francisco, CA (US); Minh Xuan Nguyen, San Jose, CA (US); David Wright Clark, Tucson, AZ (US); Anand Dhiren Thakker, Philadelphia, PA (US); Dana Alexander Sulit, Washington, DC (US); Ansis Ingus Brammanis, Toronto (CA); Nicki Zippora Dlugash, Washington, DC (US); Saman Bemel-Benrud, Washington, DC (US)

(73) Assignee: Mapbox, Inc., San Francisco, CA (US)

( * ) Notice: Subject to any disclaimer, the term of this patent is extended or adjusted under 35 U.S.C. 154(b) by 0 days.

(21) Appl. No.: 16/177,190

(22) Filed: Oct. 31, 2018

(65) Prior Publication Data

US 2019/0130625 A1    May 2, 2019

Related U.S. Application Data

(60) Provisional application No. 62/580,311, filed on Nov. 1, 2017.

(51) Int. Cl.
*G06T 11/60* (2006.01)
*G06F 3/0484* (2013.01)
(Continued)

(52) U.S. Cl.
CPC ............ *G06T 11/60* (2013.01); *G06F 3/0484* (2013.01); *G06F 3/04847* (2013.01);
(Continued)

(58) Field of Classification Search
None
See application file for complete search history.

(56) References Cited

U.S. PATENT DOCUMENTS 8,274,524 B1    9/2012  Cornell et al.
8,937,627 B1    1/2015  Otero et al.
(Continued)

OTHER PUBLICATIONS

"Designing The Blueprint style in Mapbox Studio"; posted Nov. 2015 (http://mapbox2.rssing.com/chan-13943511/all_p38.html), (Year: 2015).*

(Continued)

*Primary Examiner* — Sarah Le
(74) *Attorney, Agent, or Firm* — Fenwick & West LLP (57) ABSTRACT

A process, and corresponding system for performing the process, is described for editing and representing property values for a digital map. The process stores a library of expressions for styling a digital map. The process retrieves electronic map data and displays a user interface including a property editor panel and a visual map portion. The property editor panel displays a plurality of map styles. The visual map portion displays a representation of the electronic map data. For a selected map style, the process displays a plurality of style properties and a text field for receiving expressions corresponding to a style property. The process receives, via the text field, an expression and determines a set of suggested expressions corresponding to the style property. The process applies the received expression to the electronic map data and renders in the visual map portion an edited representation of the electronic map data.

20 Claims, 7 Drawing Sheets

(51) Int. Cl.
  *G06F 16/29* (2019.01)
  *G06F 3/023* (2006.01)
(52) U.S. Cl.
  CPC ............ *G06F 16/29* (2019.01); *G06F 3/0233* (2013.01); *G06F 2203/04806* (2013.01)

(56) References Cited

U.S. PATENT DOCUMENTS

| | | | |
|---|---|---|---|
| 9,111,380 B2* | 8/2015 | Piemonte | G06T 15/005 |
| 9,563,450 B1* | 2/2017 | Totale | G06F 8/33 |
| 10,444,940 B2 | 10/2019 | Cervelli et al. | |
| 10,444,941 B2 | 10/2019 | Cervelli et al. | |
| 2002/0091758 A1 | 7/2002 | Singh et al. | |
| 2002/0175948 A1 | 11/2002 | Nielsen et al. | |
| 2005/0231392 A1 | 10/2005 | Meehan et al. | |
| 2007/0219938 A1* | 9/2007 | Boersma | G06F 16/29 |
| 2009/0015596 A1 | 1/2009 | Fuchs et al. | |
| 2011/0214050 A1 | 9/2011 | Stambaugh | |
| 2011/0289077 A1 | 11/2011 | Wade et al. | |
| 2013/0124980 A1 | 5/2013 | Hudson et al. | |
| 2013/0147794 A1 | 6/2013 | Lee et al. | |
| 2013/0321450 A1 | 12/2013 | Hultquist et al. | |
| 2014/0340421 A1 | 11/2014 | Otero et al. | |
| 2014/0354629 A1 | 12/2014 | Adlers et al. | |
| 2014/0365935 A1 | 12/2014 | Moha et al. | |
| 2015/0170385 A1 | 6/2015 | Appleton et al. | |
| 2016/0070451 A1* | 3/2016 | Kim | G06Q 10/06 715/765 |
| 2016/0102983 A1 | 4/2016 | Javed et al. | |
| 2017/0039765 A1 | 2/2017 | Zhou et al. | |
| 2017/0052747 A1 | 2/2017 | Cervelli et al. | |
| 2017/0228899 A1 | 8/2017 | Witriol et al. | |
| 2017/0308549 A1 | 10/2017 | Sims et al. | |
| 2018/0189250 A1* | 7/2018 | Lee | G06Q 10/101 |
| 2019/0087442 A1 | 3/2019 | Zhang et al. | |

OTHER PUBLICATIONS

Amy Lee Walton, "Designing The Blueprint style in Mapbox Studio"; posted Nov. 2015 (https://blog.mapbox.com/designing-the-Walton-style-in-mapbox-studio-2e41eOc45141), (Year: 2015).*

"Ramping Up in Studio", posted Feb. 4, 2016 (http://mapbox2.rssing.com/chan-13943511/all_p41.html) (Year: 2016).*

Blythe Sheldon, "Ramping Up in Studio", posted Feb. 4, 2016 (https://blog.mapbox.com/Sheldon-up-in-studio-7f1a934270d1) (Year: 2016).*

Avenza Systems , Using MAP Themes to Automatically style CanVec+ Data on Import in MAPublisher, posted on 12, 2014, https://www.avenza.com/resources/blog/2014/12/03/using-map-themes-to-automatically-style-canvec-data-on-import-in-mapublisher/ (Year: 2014).*

Kristian Ekenes. "Using Smart Mapping in custom web apps"; posted Mar. 2016, https://www.esri.com/arcgis-blog/products/mapping/mapping/using-smart-mapping-in-custom-web-apps/ (Year: 2016).*

Oracle, "28 Using Map Components", posted Jul. 2015, https://docs.oracle.com/middleware/1213/adf/develop-faces/dvt-maps.htm (Year: 2015).*

United States Office Action, U.S. Appl. No. 15/681,286, dated Jul. 11, 2019, 28 pages.

United States Office Action, U.S. Appl. No. 15/681,290, dated May 17, 2018, 14 pages.

United States Office Action, U.S. Appl. No. 15/681,284, dated Jan. 18, 2019, 56 pages.

United States Office Action, U.S. Appl. No. 15/681,286, dated Jan. 11, 2019, 24 pages.

United States Office Action, U.S. Appl. No. 15/681,290, dated Dec. 14, 2018, 14 pages.

United States Office Action, U.S. Appl. No. 15/681,288, dated Oct. 7, 2019, 16 pages.

MacWright, T., "Introducing Mapbox Studio," Mapbox, Nov. 18, 2015, 11 pages.

* cited by examiner

EXPRESSION INTERPRETATION ENGINE FOR COMPUTER MAP VISUALIZATIONS

CROSS REFERENCE TO RELATED APPLICATIONS

This application claims the benefit of and priority to U.S. Provisional Application No. 62/580,311, filed Nov. 1, 2017, the entire contents of which are hereby incorporated by reference for all purposes as if fully set forth herein. Additionally, this application is related to U.S. Patent Publication No. 2018/0052572, filed Aug. 18, 2017, which is hereby incorporated by reference in its entirety.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While digital maps and graphical user interfaces for digital maps have entered wide use, creating such maps and interfaces is difficult using pre-existing software tools. Editing and authoring programs for creating digital map templates, colors, and features has been complex and required many manual operations. In particular, processes for customizing digital maps, or preparing digital maps in a manner that can adapt to other applications that use the maps, has been difficult or inconvenient.

Data-driven (or zoom-driven) style property was previously defined using a stop function. A stop function is a ramp relating a feature property or zoom value to style values. Stop functions are limited in that they can only reference a single feature property at a time, so the only way to make use of multiple properties in the data using stops is to make multiple layers. In addition, stop functions are, by definition, based on a simple set of input-output pairs. This means that more complex control, for example, using arithmetic or conditional logic, is not possible. Therefore, there is a need for more flexible, comprehensive and convenient computer-based techniques for creating, modifying and manipulating digital maps and graphical user interfaces for digital computer display devices that display maps.

SUMMARY

As described herein, electronic map data is divided into a plurality of vector map tiles at a plurality of zoom levels, wherein each map tile corresponds to a portion of a geographic map. The map tiles are rendered when requested by a client, and each map tile is rendered based on one or more map styles, which defines the visual appearance of an electronic map, such as what map data to display in the electronic map, what order to render the data in, and how to style the data when it is rendered.

A map style comprises one or more map style layers, each of which may include a reference to a portion of electronic map data and one or more visual style rules to be applied to the portion of electronic map data. Map editing instructions are programmed or configured to cause display, in a graphical user interface of a computer display device and in association with a digital map, of one or more style layer properties of the digital map.

A user interface comprises a property editor panel, a visual map portion, and at least one text field. The property editor panel is configured to display a plurality of map styles that reference a portion of electronic map data. The visual map portion is configured to display a representation of the electronic map data with the map styles applied. The at least one text field is configured to receive expressions corresponding to a style property. The expressions comprise pre-programmed functions, logical operations, mathematical operations, string operations, and color operations for styling a digital map.

A process, and corresponding system for performing the process, is described herein for editing and representing property values for a digital map. The process stores a library of expressions for styling a digital map. The library of expressions includes pre-programmed functions, logical operations, mathematical operations, string operations, and color operations. The process retrieves electronic map data from a style sheet corresponding to a vector map tile set for the digital map and displays a user interface including a property editor panel and a visual map portion. The property editor panel displays a plurality of map styles that reference a portion of the electronic map data. The visual map portion displays a representation of the electronic map data with the map styles applied. For a selected map style, the process displays in the property editor panel a plurality of style properties and at least one text field for receiving expressions corresponding to a style property. The process receives, via the text field, an expression to apply to the style property and determines, from the library of expressions, a set of suggested expressions corresponding to the style property. The process applies the received expression to the electronic map data for the style property and renders in the visual map portion an edited representation of the electronic map data for the style property with the received expression applied.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

System Overview

Figure 1A:
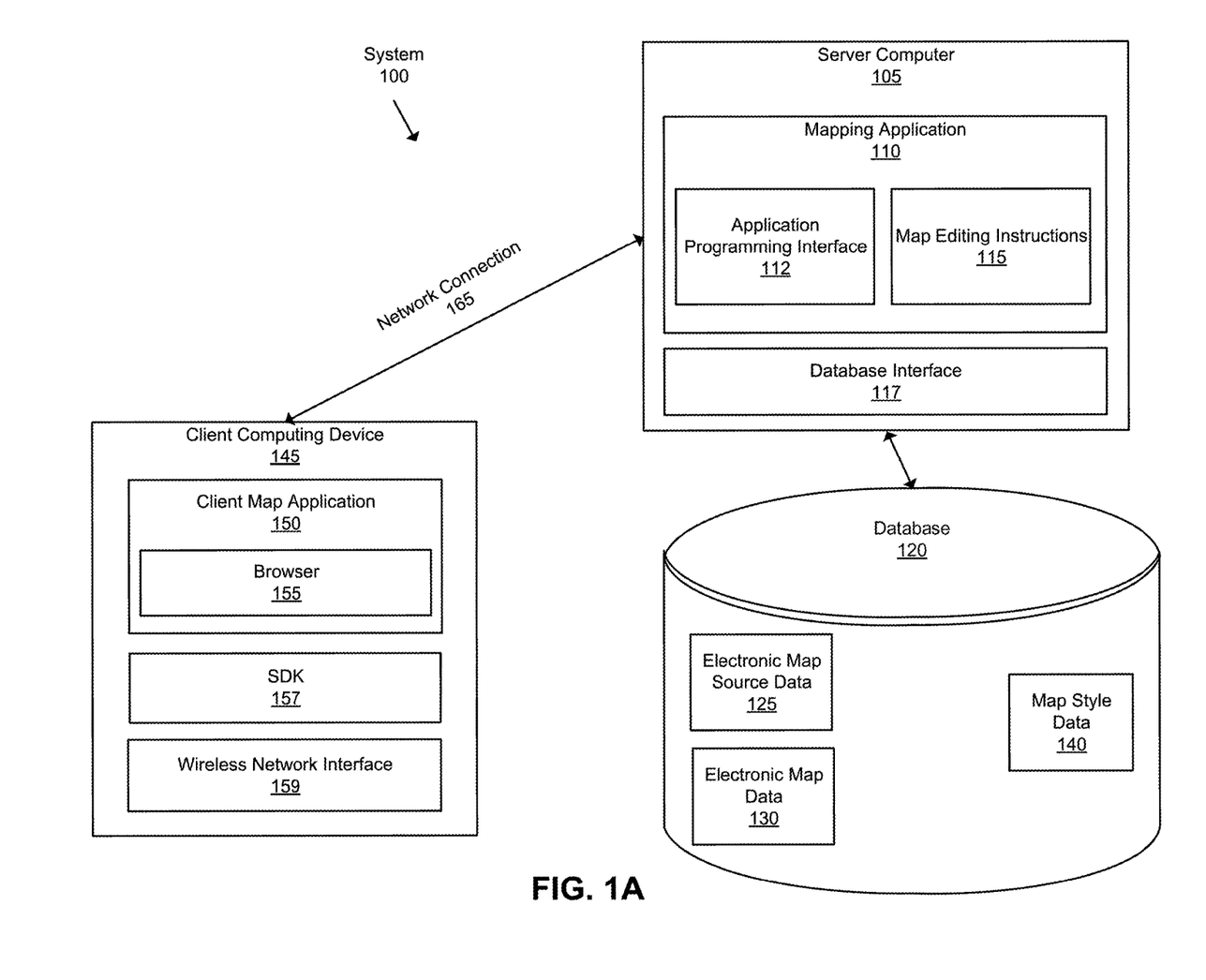
FIG. 1A illustrates an example computer system in which the techniques described herein may be practiced according to one or more embodiments.

FIG. 1A illustrates an example computer system in which the techniques described may be practiced according to one or more embodiments.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a client computing device 145 that is coupled via a network connection 165 to a server computer 105, which is coupled to a database 120. The server computer comprises a mapping application 110, an application programming interface (API) 112, map editing instructions 115, and a database interface 117. The database 120 comprises electronic map source data 125, electronic map data 130, and map style data 140. The client computing device 145 comprises a client map application 150, browser 155, and wireless network interface 159.

In one embodiment, client computing device 145 is any computing device, such as a work station, personal computer, general purpose computer, laptop, hand-held computer, wearable computer, cellular or mobile phone, portable digital assistant (PDA), tablet computer, and the like. Although a single client computing device is depicted in FIG. 1A, any number of client computing devices may be present. Each client computing device 145 is communicatively connected to server computer 105 through network connection 165 which comprises any combination of a LAN, a WAN, one or more internetworks such as the public Internet, a cellular network, or a company network.

Client computing device 145 also includes network interface 159, which is used by the client computing device 145 to communicate with other devices. In particular, network interface 159 is used to establish network connection 165 to server computer 105. Network interface 159 may use Ethernet, WiFi, WiMAX, Bluetooth, ZigBee, cellular standards, or others.

Client computing device 145 also includes other hardware elements, such as one or more input devices, memory, processors, and the like, which are not depicted in FIG. 1A.

Client computing device 145 also includes applications, software, and other executable instructions to facilitate various aspects of embodiments described herein. These applications, software, and other executable instructions may be installed by a user, owner, manufacturer, or other entity related to the client computing device.

In one embodiment, client computing device 145 includes client map application 150 which is software that displays, uses, supports, or otherwise provides electronic mapping functionality as part of the application or software. Client map application 150 may be any type of application, such as a taxi service, a video game, a chat client, a food delivery application, etc. In an embodiment, client map application 150 obtains electronic mapping functions through SDK 157, which may implement functional calls, callbacks, methods, or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users. In one embodiment, SDK 157 is part of the client map application 155. The client map application 150 may be on the same server as the database 120 instead of on the client computing device 145.

In one embodiment, client computing device 145 includes browser 155. Browser 155 is a computer application that may request and execute instructions received from web servers to generate complex user interfaces that are presented to a user through one or more devices, such as a display or speakers. In response to input from a user, such as a mouse click indicating that the user selected an object defined in the instructions, such as a button or a text box, a browser may send a request based on the selected object to the web server. The request may be a request for data or include data to be processed by the web server. In an embodiment, browser 155 may receive instructions from server computer 105 to generate a user interface of a map editing program through which a user may create and modify map styles. Additionally or alternatively, client computing device 145 may include a map editing application or software that provides map editing functions as part of the application or software. In another embodiment, browser 155 is on a different client device than the client map application 150.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1A shows a single element, the server computer 105 broadly represents one or more multiple server computers, such as a server cluster, and the server computer 105 may be located in one or more physical locations. Server computer 105 may also represent one or more virtual computing instances that execute using one or more computers in a datacenter such as a virtual server farm.

Server computer 105 is communicatively connected to database 120 and client computer device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1A, database 120 may span multiple devices located in one or more physical locations. For example, database 120 may include one or nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, map tile filter 135, and map style data 140. These datasets may be stored as columnar data in a relational database or as flat files. In some embodiments, the database 120 stores a library of expressions. Each expression of the library of expressions may include inline documentation. Expressions are described in detail below with reference to FIG. 5.

In one embodiment, electronic map source data 125 is raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector map tiles which may be subject to map style data to impose different display styles. Electronic map data 130 may be updated at any suitable interval, and may include additional information beyond that derived from electronic map source data 125.

In an embodiment, electronic map data is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox, Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of features on the map. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, a map tile is rendered based on a map style. Each map style of a plurality of map styles can be used to render the same map tile. In other words, the same portion of electronic map data may be displayed in a variety of visual styles. For example, in one map application, map tiles may be displayed with dark colors while in a second map application, map tiles may be displayed with light colors. Additionally or alternatively, the electronic map data required may differ based on map style. For example, in one map application, roads within a map tile may be displayed while buildings are not displayed. In another map application, landscape and rivers may be displayed while roads are not displayed.

In one embodiment, map style data 140 is digital data that defines one or more visual map styles for electronic maps. May style data 140 may comprise a plurality of map styles. A map style defines the visual appearance of an electronic map, such as what map data to display in the electronic map, what order to render the data in, and how to style the data when it is rendered. In an embodiment, a map style may include information including, but not limited to, references to portions of electronic map data 130, map images, fonts, and rules specifying how the portions of electronic map data 130 should be styled when rendering a digital map, such as colors, line styles, line thickness, and etc.

In an embodiment, each map style may be stored as a document. For example, a map style may be stored as a JSON object that adheres to a particular style format specification. A map style may be generated using a map editing program or written independently and uploaded to a server computer.

In an embodiment, a map style comprises one or more map style layers. Each map style layer may include a reference to a portion of electronic map data and one or more visual style rules to be applied to the portion of electronic map data. In an embodiment, the reference to the portion of electronic map data specifies a particular map data source for the maps style layer. For example, the map style may specify a particular map tile set from a plurality of map tile sets as the map data source for the style layer. Additionally or alternatively, the map style layer may specify a particular data layer within the map tile set to associate with the style layer. For example, a style layer may specify visual style rules for a "Water" data layer of a set of map tiles.

In an embodiment, style layer data may include data indicating a style layer type for a map style layer. A map style layer may be a particular map style layer type, such as lines, polygons, symbols, circles, 3D polygons, and images. Additionally or alternatively, the style layer data may specify property values for one or more style layer properties associated with the style layer type. The style layer data may include data indicating property values to associate with each style layer property. In an embodiment, a property value may be a static value. Additionally or alternatively, the property value may be a dynamic value. For example, the property value may be a zoom level dependent value, such as a function that outputs a property value based on an input zoom level.

Each style layer type has a set of properties for which values may be specified. For example, a line style layer type may include style layer properties such as line width, line color, line style (solid, dotted, dashed), line cap style, line positioning, etc. As another example, a polygon style layer type may include style layer properties such as fill color, fill pattern, opacity, anti-aliasing, fill outline color, polygon positioning, etc.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from client computing devices, sending electronic map data to client computing devices, receiving map style data 140 from map editing applications, receiving electronic map source data 125 from data providers, processing electronic map source data 125 to generate electronic map data 130, and any other aspects of embodiments described herein. Mapping application 110 includes map editing instructions 115 which are programmed or configured to receive and store modified map style data. Additionally or alternatively, map editing instructions 115 may include instructions to perform the process as detailed in FIG. 6.

In one embodiment, map editing instructions 115 are programmed or configured to cause display, in a graphical user interface of a computer display device and in association with a digital map, one or more style layer properties of the digital map, wherein each style layer comprises a plurality of style layer properties. Map editing instructions 115 may be further programmed or configured to receive input specifying a particular style layer of the one or more style layers and display style layer properties of the particular style layer. Map editing instructions 115 may be further programmed or configured to receive input specifying an updated property value for a particular style layer property, assign the updated property value to the particular style layer property, and store an updated map style in map style data 140 that includes the updated property value.

Additionally or alternatively, map editing instructions 115 may include instructions to cause re-display of the digital map in the graphical user interface based on the updated property value for the particular style layer property.

Additionally or alternatively, map editing instructions 115 may include instructions to receive input specifying a property type and cause display of one or more style layer properties of the specified property type.

In an embodiment, map editing instructions 115 may include instructions for causing display of a graphical user interface of a map editing program at client computing devices. Map editing instructions 115 may generate and send instructions to browser 155 to generate the graphical user interface. Additionally or alternatively, map editing instructions 115 may provide data to a map editing application or other software that provides map editing functions as part of the application or software. For example, map editing instructions may send map style data to a map editing application, receive new or updated map style data, and store received map style data to map style data 140.

A map editing program may be used to design a map to a user's specifications by allowing a user to select or upload map data, add custom fonts and images, or define and edit map styles, among other features. In an embodiment, a map editing program includes a map style editor creating custom map styles to a user's specifications. The map style editor may include a graphical user interface through which a user can define a custom map style or edit existing map styles.

Additionally or alternatively, the map style editor may include a visual map. The visual map may be displayed in conjunction with one or more map style layer properties. In an embodiment, the visual map is rendered based on the map style being edited in the map style editor. As changes are made to style layer properties, the visual map may be updated to reflect the changes. For example, if a user specifies a new width property value for roads, the map style editor may automatically re-display the visual map and render any roads shown within the map area using the new width property value.

According to one embodiment, the techniques described herein are implemented by one or more special-purpose computing devices. For example, the server computer 105 and client computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 1B:
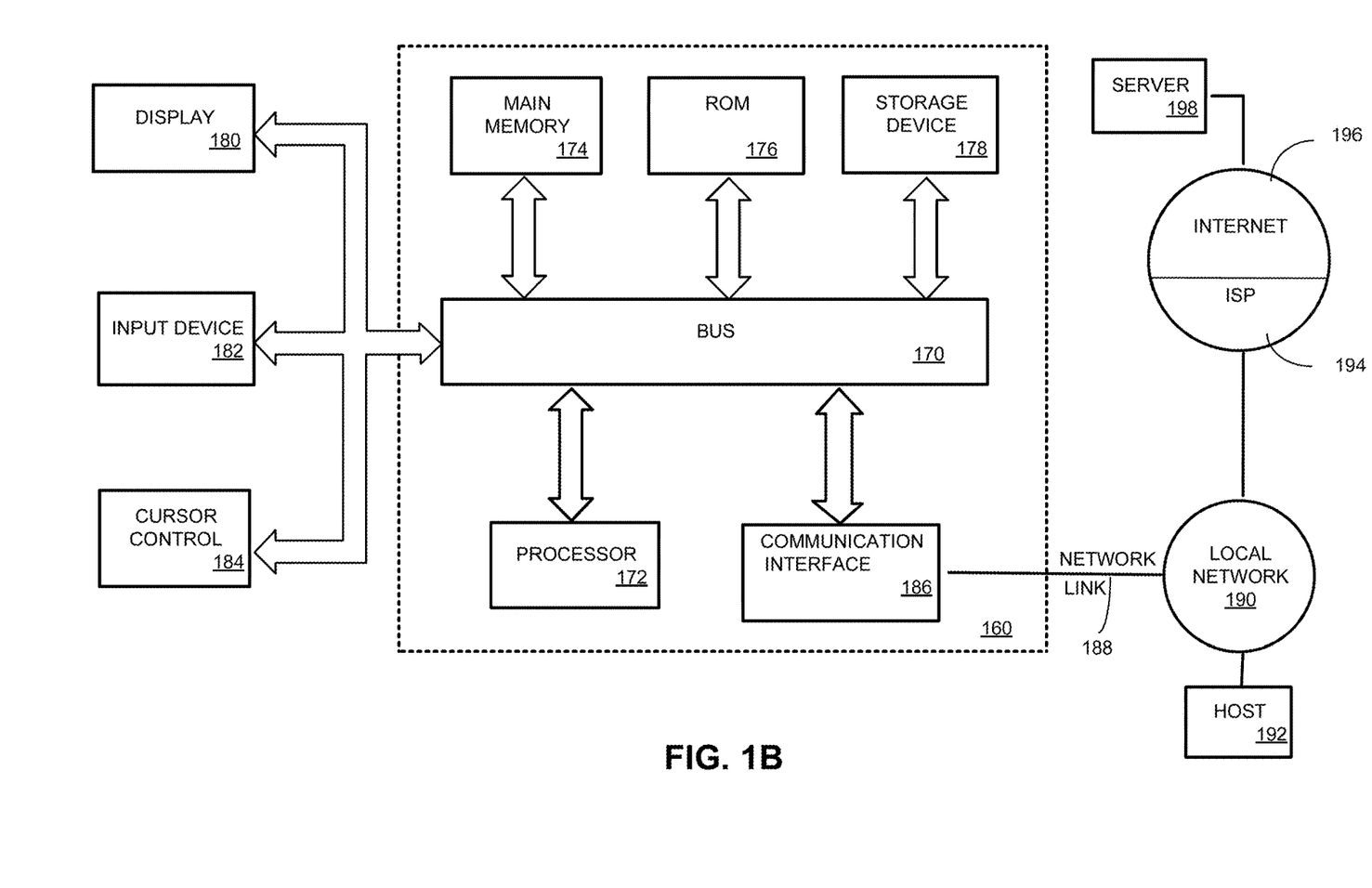
FIG. 1B illustrates a computer system upon which an embodiment may be implemented according to one or more embodiments.

For example, FIG. 1B is a block diagram that illustrates a computer system 160 upon which an embodiment of the invention may be implemented. Computer system 160 includes a bus 170 or other communication mechanism for communicating information, and a hardware processor 172 coupled with bus 170 for processing information. Hardware processor 172 may be, for example, a general purpose microprocessor.

Computer system 160 also includes a main memory 174, such as a random access memory (RAM) or other dynamic storage device, coupled to bus 170 for storing information and instructions to be executed by processor 172. Main memory 174 also may be used for storing temporary variables or other intermediate information during execution of instructions to be executed by processor 172. Such instructions, when stored in non-transitory storage media accessible to processor 172, render computer system 160 into a special-purpose machine that is customized to perform the operations specified in the instructions.

Computer system 160 further includes a read only memory (ROM) 176 or other static storage device coupled to bus 170 for storing static information and instructions for processor 172. A storage device 178, such as a magnetic disk, optical disk, or solid-state drive is provided and coupled to bus 170 for storing information and instructions.

Computer system 160 may be coupled via bus 170 to a display 180, such as a cathode ray tube (CRT), LCD screen, LED screen, or touch screen, for displaying information to a computer user. An input device 182, which may include alphanumeric and other keys, buttons, a mouse, a touchscreen, or other input elements, is coupled to bus 170 for communicating information and command selections to processor 172. In some embodiments, the computer system 160 may also include a cursor control 184, such as a mouse, a trackball, or cursor direction keys for communicating direction information and command selections to processor 172 and for controlling cursor movement on display 180. The cursor control 184 typically has two degrees of freedom in two axes, a first axis (e.g., x) and a second axis (e.g., y), that allows the device to specify positions in a plane.

Computer system 160 may implement the techniques described herein using customized hard-wired logic, one or more ASICs or FPGAs, firmware and/or program logic which in combination with the computer system causes or programs computer system 160 to be a special-purpose machine. According to one embodiment, the techniques herein are performed by computer system 160 in response to processor 172 executing one or more sequences of one or more instructions contained in main memory 174. Such instructions may be read into main memory 174 from another storage medium, such as storage device 178. Execution of the sequences of instructions contained in main memory 174 causes processor 172 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 178. Volatile media includes dynamic memory, such as main memory 174. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 170. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 172 for execution. For example, the instructions may initially be carried on a magnetic disk or solid-state drive of a remote computer. The remote computer can load the instructions into its dynamic memory and send the instructions over a telephone line using a modem. A modem local to computer system 160 can receive the data on the telephone line and use an infra-red transmitter to convert the data to an infra-red signal. An infra-red detector can receive the data carried in the infra-red signal and appropriate circuitry can place the data on bus 170. Bus 170 carries the data to main memory 174, from which processor 172 retrieves and executes the instructions. The instructions received by main memory 174 may optionally be stored on storage device 178 either before or after execution by processor 172.

Computer system 160 also includes a communication interface 186 coupled to bus 170. Communication interface 186 provides a two-way data communication coupling to a network link 188 that is connected to a local network 190. For example, communication interface 186 may be an integrated services digital network (ISDN) card, cable modem, satellite modem, or a modem to provide a data communication connection to a corresponding type of telephone line. As another example, communication interface 186 may be a local area network (LAN) card to provide a data communication connection to a compatible LAN. Wireless links may also be implemented. In any such implementation, communication interface 186 sends and receives electrical, electromagnetic or optical signals that carry digital data streams representing various types of information.

Network link 188 typically provides data communication through one or more networks to other data devices. For example, network link 188 may provide a connection through local network 190 to a host computer 192 or to data equipment operated by an Internet Service Provider (ISP) 194. ISP 194 in turn provides data communication services through the world wide packet data communication network now commonly referred to as the "Internet" 196. Local network 190 and Internet 196 both use electrical, electromagnetic or optical signals that carry digital data streams. The signals through the various networks and the signals on network link 188 and through communication interface 186, which carry the digital data to and from computer system 160, are example forms of transmission media.

Computer system 160 can send messages and receive data, including program code, through the network(s), network link 188 and communication interface 186. In the Internet example, a server 198 might transmit a requested code for an application program through Internet 196, ISP 194, local network 190 and communication interface 186.

The received code may be executed by processor 172 as it is received, and/or stored in storage device 178, or other non-volatile storage for later execution.

Figure 2:
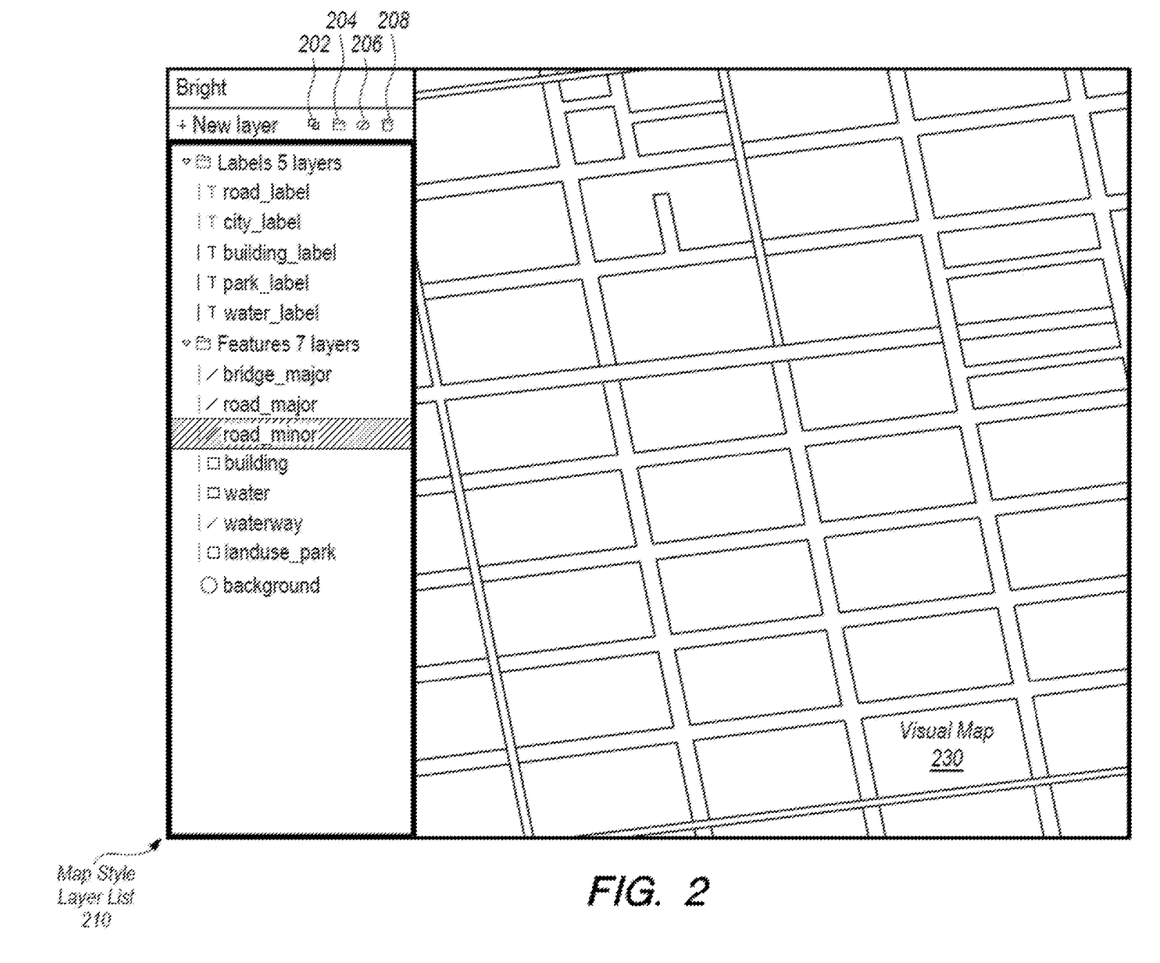
FIG. 2 illustrates a map style editor according to one or more embodiments.

FIG. 2 illustrates an example graphical user interface of a map style editor. The map style editor includes style layer list 210 and visual map 230.

In an embodiment, style layer list 210 displays a list of style layers and style layer groups for the selected map style. Additionally or alternatively, the style layer list 210 indicates the number of layers within each layer group next to the name of the layer group. In the illustrated example, map style layer list 210 lists a plurality of style layers and style layer groups for a map style titled "Bright."

Additionally or alternatively, a user can create, sort, group, and delete layers using the map style editor. In the illustrated example, style layer list 210 includes a toolbar comprising a new layer button, a duplicate layer button 202, a group/ungroup layers button 204, a show/hide layers button 206, and a delete layer button 208. The new layer button causes the map style editor to display a dialog for specifying map data styled by the map style layer, such as a source map tile set, style layer filters, and other information for creating a new map style layer. The duplicate layer button 202 allows a user to copy a style layer or a group of style layers. The group/ungroup layers button 204 groups multiple selected layers or ungroups a group of style layers. The show/hide layers button 206 shows or hides one or more selected style layers on the map. The delete layer button 208 deletes one or more selected style layers from the map style.

Visual map 230 is a visual representation of a particular area of a digital map. In an embodiment, one or more map tiles corresponding to the particular area of the digital map are requested and processed in order to render the visual map. Visual map 230 may be updated or re-redisplayed as a user pans or zooms the map. Additionally or alternatively, visual map 230 may be rendered based on the selected map style that is being edited in the map style editor. When changes are made to the map style, the map style editor may update or re-display visual map 230. In other words, visual map 230 may provide a real-time representation of how digital maps will look if rendered using the selected map style.

In an embodiment, the map style editor displays a list of style layer properties and property values for one or more style layers. A user may view or modify the property value assigned to one or more style layer properties using the map style editor.

Figure 3:
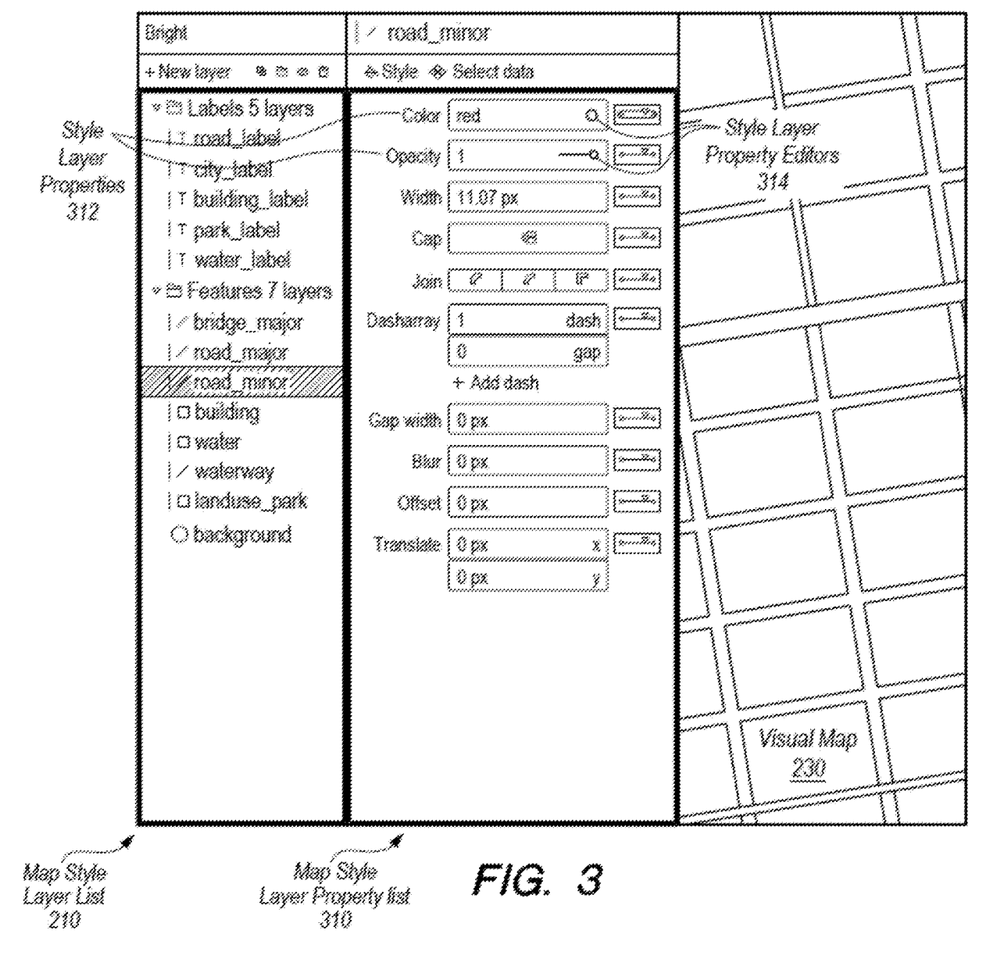
FIG. 3 illustrates a map style layer property list of a map style editor according to one or more embodiments.

In an embodiment, selecting one or more style layers in the style layer list 210 allows a user to view and edit the properties for the selected layer(s). FIG. 3 illustrates an example map style layer property list of the map style editor, according to a first embodiment.

In the illustrated example, the "road_street" style layer is selected in style layer list 210. Map style layer property list 310 is displayed in the graphical user interface. Style layer property list 310 displays style layer properties that are associated with a selected style layer. Additionally or alternatively, style layer property list 310 displays the property value assigned to each style layer property. In the present example, style layer property list 220 includes a plurality of style layer properties for the "road_street" style layer, such as the ones indicated by the label style layer properties 312.

In an embodiment, style layer property list 310 includes a property editor for one or more style layer properties, such as the style layer property editors 314 indicated for style layer properties 312. In the example illustrated in FIG. 3, the Color, Pattern, and Opacity style layer properties each have a corresponding text field. The text fields indicate the current value of each style layer property. Selecting a property editor may bring up a graphical editor where the user can select a value for the property, such as a color selection panel for the Color property. A user may also edit the property value by typing or pasting text into the text field, or adjust a numerical value using arrow keys. Other properties may have buttons or other types of user interface components that allow a user to select or specify a property value.

Figure 4:
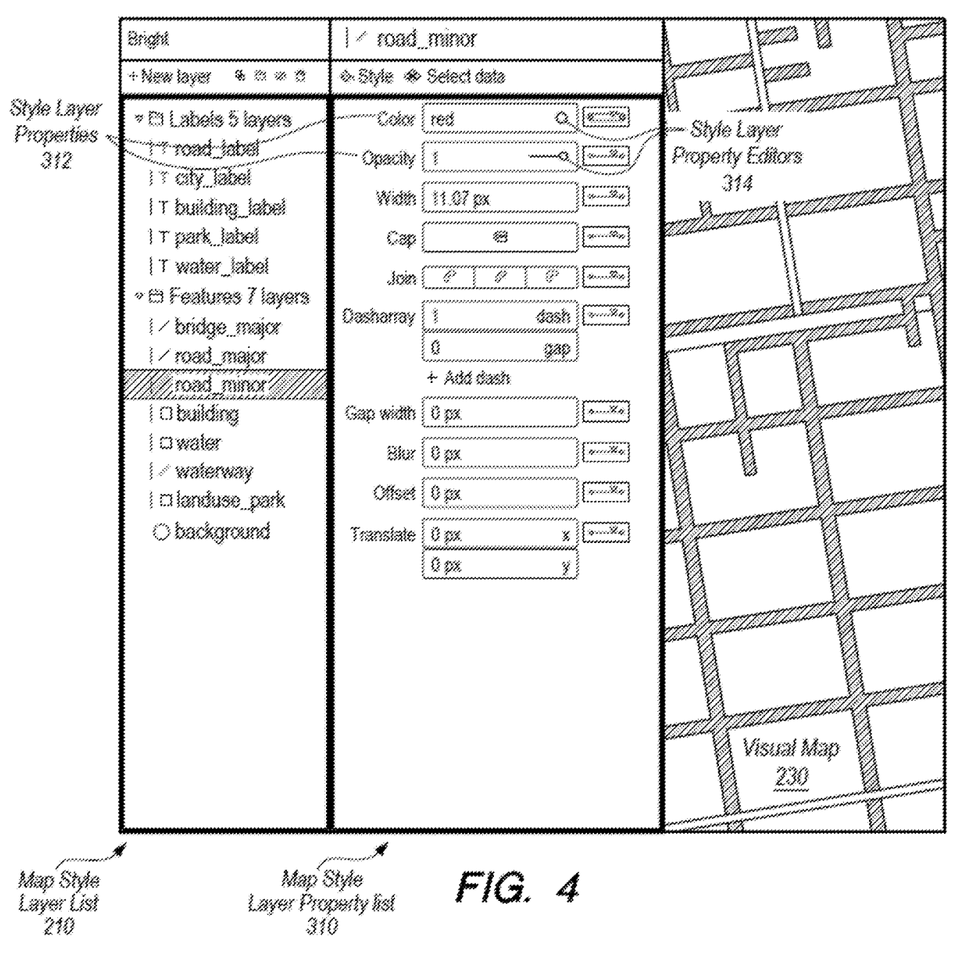
FIG. 4 illustrates a map style editor after receiving a property value from a user according to one or more embodiments.

In an embodiment, if a user modifies a value for a property, visual map 230 is redisplayed to reflect the updated property value. Additionally or alternatively, the property editor may be updated to display the updated property value. FIG. 4 illustrates the visual map of the map style editor after a property value is modified. In FIG. 4, the property value for the "Color" property has been set to "#000" (black). Property editor 314 displays the updated property value. Additionally, visual map 230 is updated to display streets in black instead of white.

In an embodiment, selecting a property editor may cause the map style editor to display a graphical editor where the user can select an existing property value. An existing property value may include other values assigned to the same style property in other style layers. For example, if a line color property is selected, the map style editor may display a list of line colors used in other style layers. Additionally or alternatively, the map style editor may display a list of values for other properties of a similar value type. For example, selecting a style property with a color property value may cause the map style editor to display a list of all colors used in other style layers of the map, such as other line colors, fill colors, text color, and etc.

Figure 5:
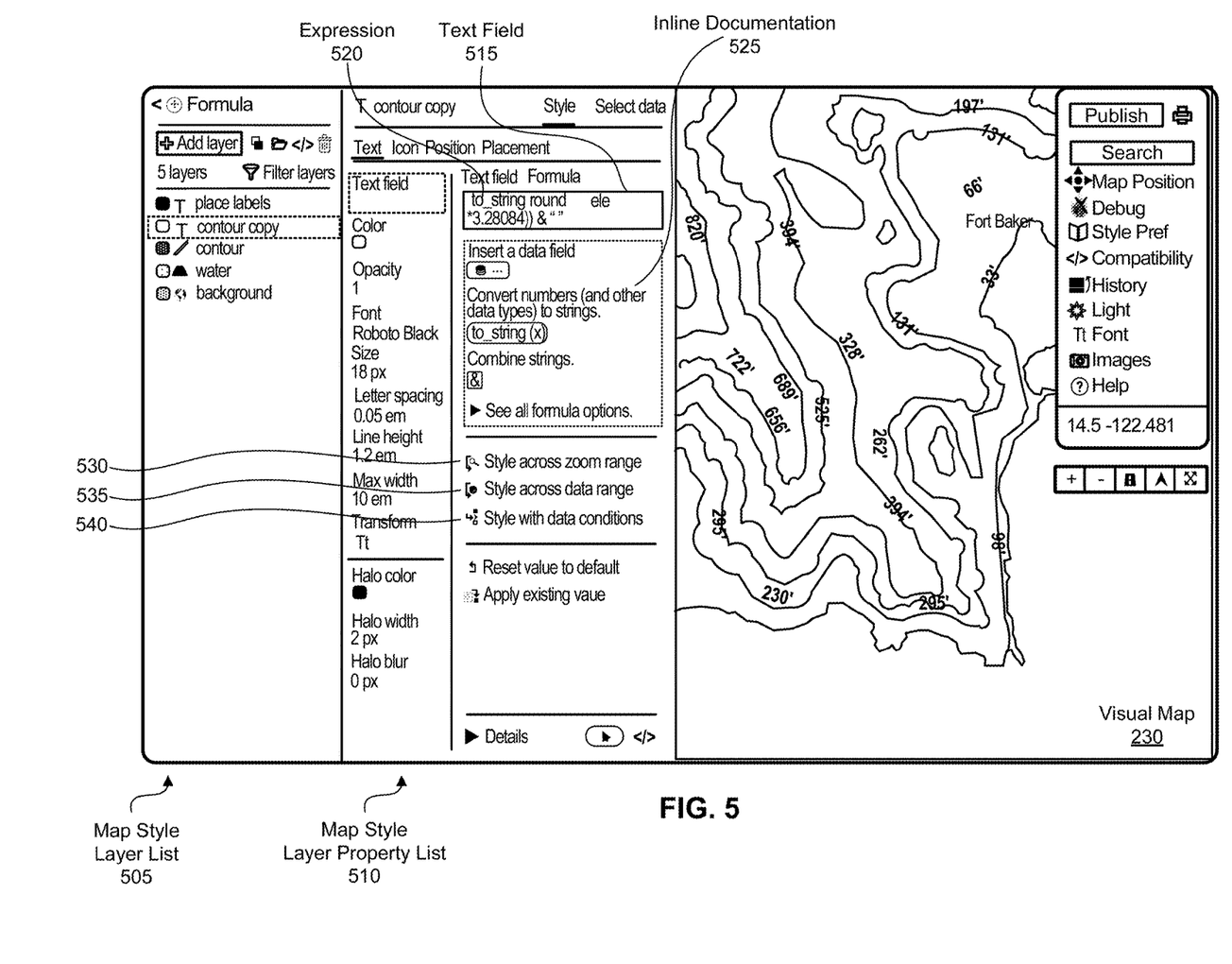
FIG. 5 illustrates a map style layer property list of a map style editor including an expressions interpretation engine according to one or more embodiments.

FIG. 5 illustrates a map style layer property list of a map style editor according to one or more embodiments. In addition to a map style layer list 505 and the visual map 230, the map style editor includes a text field 515. In some embodiments, the map style layer list 505 is substantially the same as the style layer list 210.

The map style layer list 505 displays a list of style layers and style layer groups for the selected map style. In the embodiment of FIG. 5, the map style layer list 505 indicates the number of layers (e.g., 5 layers). In the illustrated example, map style layer list 505 lists a plurality of style layers for a map style titled "Formula."

The map style editor displays a list of style layer properties and property values for one or more style layers. A user may view or modify the property value assigned to one or more style layer properties using the map style editor.

Selecting one or more style layers in the map style layer list 505 allows a user to view and edit the properties for the selected layer(s). In the illustrated example, the "contour copy" style layer is selected in the map style layer list 505.

Map style layer property list 510 is displayed in the graphical user interface. Map style layer property list 510 displays style layer properties that are associated with a selected layer. Additionally or alternatively, map style layer property list 510 displays the property value assigned to each style layer property. In the present example, map style layer property list 510 includes a plurality of style layer properties for the "contour only" style layer, such as a "Text field" property.

In the illustrated example, the "Text field" property is selected in the map style layer property list 510. The "Text field" property may include, among other components, a user interface for writing conditionals (e.g., text field 515), a feature property lookup user interface (e.g., "Insert a data field") that gives a user access to data property values in values of all types, a universal string editing widget (e.g., text field 515), a universal number editing widget (e.g., text field 515), and a user interface for writing zoom or property curve expressions (e.g., "Style across zoom range" and "Style across data range"), with data lookup, more interpolation options, and the ability for nested decision expressions.

In the illustrated example, the text field 515 is part of the "Text field" property of the map style layer property list 510. In some other embodiments, the text field 515 is part of other properties of the map style layer property list 510. Property values of the map style layer property list 510 may be specified as an expression. The text field 515 is configured to receive an expression (e.g., expression 520) corresponding to a style property.

Expressions define how one or more feature property values and/or the current zoom level are combined using logical, mathematical, string, or color operations to produce the appropriate style property value or filter decision. Expressions remove the limitations presented by stop functions. Stop functions are limited to only being able to style one property at a time and are based on simple input-output pairs, so arithmetic or conditional logic is not possible. Expressions allow a user to specify not just a set of input-output pairs, but also many other types of relationships between the input and output. A user may style multiple feature properties or zoom levels at once, apply conditional logic, and manipulate data with arithmetic and string operations. Expressions allow a user to have complete control over visualizing large data sets in real-time.

Expressions may include data field lookup operations, logical operations, mathematical operations, string operations, and color operations for styling the visual map 230. Expressions may be used for, e.g., unit conversion, number formatting, decimal precision, thousands separator, conditionals, concatenation, customizable interpolation, arithmetic on feature properties within functions, localization, numeric literals, string literals, array and object literals, curves, and the like.

Mathematical operations perform arithmetic on source data. For example, mathematical operations may be used to perform calculations to convert units. Feature data may include properties that are in a particular unit. Displaying the data in units appropriate to, e.g., a preference or location of a user, requires a mathematical operation. Another example is to visualize quantitative data with circles. Since the visual size of a circle on a visual map is its area, circle radius may be scaled with the square root of the input data.

String operations allow for dynamic control over label text such as uppercase, lowercase, and title case transforms without having to modify, re-prepare, and re-upload the data. Without this functionality, crafting and iterating on label content entails a large data-preparation burden. String operations also allow for control over icon images (e.g., sprite selection).

Conditional logic uses basic if-then logic. For example, conditional logic may be used to decide what text to display for a label based on available properties in the feature or even the length of the name. Suppose a user would like to use bilingual labels for place names on the visual map 230, but the data includes some features with both a local name and an English name, some only with a local name, and some with only an English name. Conditional logic may be used to specify how the labels work in each of these cases.

In some embodiments, expressions syntax use a LISP syntax and are represented using JSON arrays. Expressions may be formatted as [expression_name, argument_0, argument_1, . . . ]. The expression_name is the type of expression. For example, '*' is used to multiply two arguments or 'case' to create conditional logic. The arguments (e.g., argument_0, argument_1, etc.) are either literal (e.g., numbers, strings, or Boolean values) or expressions. The number of arguments may vary based on the expression. For example, ['*', ['pi'], ['^', 3, 2] is an expression to perform a basic arithmetic expression (pi*3^2). This example uses a '*' expression to multiply two arguments. The first argument is 'pi,' which is an expression that returns the mathematical constant pi. The second argument is another expression: a '^' expression with two arguments. 3^2 is returned, and the result is multiplied by pi.

In some other embodiments, expressions use another syntax (e.g., C, C++, Java, etc.). In the example illustrated by FIG. 5, the expression 520 uses C++ syntax. The text field 515 includes the expression 520, to_string(round (ele*3.28084)) & "'", which converts units (e.g., meters to feet) in the contour layer of a terrain tileset. ele or elevation is a data field. Data fields may be stored in the database 120. In some embodiments, the "Insert a data field" property accesses and displays a list of data fields and, responsive to a selection, inputs the selected data field to the text box 515. Elevation values ele are multiplied by 3.28084 to convert from meters to feet. Then, round(x) casts elevation values ele in feet (e.g., double, long, etc.) to integers. to_string(x) converts the rounded elevation values ele to strings. Finally, & "'" combines the elevation value ele string and a foot string denoted by a prime (e.g., 722 & "'" yields 722'). The expression 520 may include inline documentation 525. Inline documentation 525 gives exposition to help a user understand what an expression is saying and doing. In the example illustrated by FIG. 5, inline documentation 525 gives exposition for to_string(x) and & of the expression 520: to_string(x) converts numbers (and other data types) to strings and & combines strings.

In some embodiments, the text field 515 displays a set of suggested expressions from a library of expressions based on a portion of an expression. The text field 515 may receive the portion of an expression from a user via an IO device (e.g., keyboard). For example, the text field 515 displays a graphical control element such as a drop-down list that allows the user to select an expression of the set of suggested expressions. Responsive to a selection, the expression is input to the text field 515. In some embodiments, an error message is displayed responsive to receiving a bad input. The error message may indicate the type of error detected and/or where the error occurred in the text field 515. Each expression of the set of suggested expressions may include inline documentation 525. In some embodiments, a fallback mode may be enabled or disabled with a switch. Unless fallback mode is enabled, no confirmation action is needed to add an expression from the set of suggested expressions. The graphical control element may show possible actions on hover (e.g., words and inline input). Both possible actions may appear on hover, so that the more common action of adding an expression is always one-click away, while to option to add a fallback is just as accessible. Additionally or optionally, the graphical control element may show possible actions on hover (e.g., icons and popover). The entire hit area of the value name and description can be used to add an expression, and it deemphasizes the fallback path that will not need to be taken as frequently. In some embodiments, the library of expressions is stored in the database 120.

In some embodiments, the "Text field" property of the map style layer property list 510 further includes a "Style across zoom range" 530 property, a "Style across data range" 535 property, and a "Style with data conditions" 540 property. Although the properties 530, 535, 540 shown in FIG. 5 are associated with the "Text field" property, the present disclosure is not limited thereto. In some embodiments, the properties 530, 535, 540 are associated with other properties (e.g., "Color" property) of the map style layer property list 510. The properties 530, 535, 540 may include an axis user interface (not shown in FIG. 5) configured to set a range for an expression. User interactions with the axis user interface to set a range for an expression may include, e.g., swipe, scroll, click, and drag gestures being performed on the client computing device 145.

The range may be a zoom range or a data range. A zoom range may change the map style as the map zooms in and out. For example, a user adjusts font size based on zoom. In the example illustrated by FIG. 5, the expression 520, to_string(round(ele*3.28084)) & "'", may be styled across a zoom range. For example, under the "Style across zoom range" 530 property, a user interacts with an axis user interface to set a zoom range for the expression 520 and, as a result, the expression 520 is applied over the set zoom range. Conditional expressions may be nested within a zoom expression. For example, if a zoom level is greater than five and area is less than 80,000 square kilometers, display an abbreviated name; else display the full name.

A data range may vary interpolatable values (e.g., numbers, colors, etc.) across a range based on a data field. For example, under the "Color" property of the map style layer property list 510, a user may select the "Style across a data range" 535 property and interact with an axis user interface to set a data range for fill color. A data range may also vary non-interpolatable values. In some embodiments, a user defines control points of a cubic Bezier curve for interpolation. The cubic Bezier curve may be used to visualize elevation. In some embodiments, a user may have control over extremes of a choropleth gradient. Stops may be defined against an axis user interface of property values. The axis user interface of property values may be a color-axis user interface being extensible to other use cases such as styling traffic data color by two different dimensions (e.g., congestion level and structure type).

The text field 515 may be configured to define a logical statement. In some embodiments, the logical statement is a data condition that applies a particular style to non-interpolatable data (e.g., road classifications, landuse types, etc.) of the electronic map data. Data conditions define logical statements that resolve to true or false, and, if true, apply a particular style. For example, under the "Color" property of the map style layer property list 510, a user may select "Style with data conditions" 540 to define a logical statement that assigns a HSL (hue, saturation, lightness) or RGB (red, green, blue) value to a particular landuse type.

Figure 6:
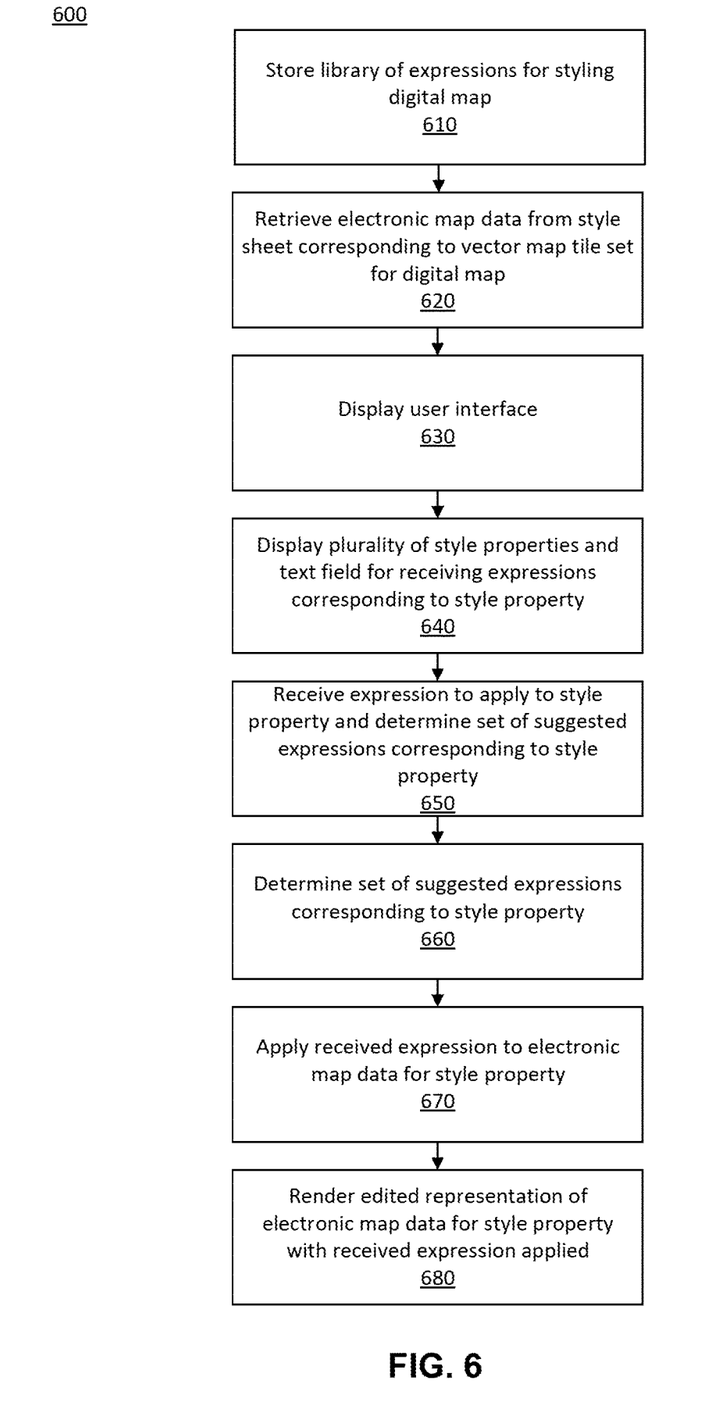
FIG. 6 illustrates a flowchart of a process for interpreting expressions for computer map visualizations according to one or more embodiments.

Referring to FIG. 6, a flowchart is shown of a process 600 for interpreting expressions for computer map visualizations, according to an embodiment. In various embodiments, the operations of the process 600 of FIG. 6 may be implemented in programming by a server computer 105 or its components as described herein. For example, the operations of process 600 may be performed by the mapping application 110 according to map editing instructions 115 as described with reference to FIGS. 1-5. In some examples, the server computer 105 may execute a set of instructions or sequence of instructions (e.g., the map editing instructions 115) to control the functional elements of server computer 105 to perform the functions described below. Additionally or alternatively, server computer 105 may perform aspects of the functions described below using special-purpose hardware. In some embodiments, the map editing instructions 115 may instruct the server computer to interact with the database 120 to perform the functions described below using database interface 117. The process 600 steps with dashed outlines represent optional steps. In some embodiments, one or more functions described below may be performed by the client computing device 145.

Initially, the server computer 105 executing the mapping application 110 stores 610 a library of expressions for styling a digital map, e.g., in database 120. The library of expressions includes pre-programmed functions, logical operations, mathematical operations, string operations, and color operations. Expressions may be used for, e.g., unit conversion, number formatting, decimal precision, thousands separator, conditionals, concatenation, customizable interpolation, arithmetic on feature properties within functions, localization, numeric literals, string literals, array and object literals, curves, and the like. The server computer 105 executing the mapping application 110 retrieves 620 electronic map data from a style sheet corresponding to a vector map tile set for the digital map, and displays 630 a user interface, e.g., as shown in FIG. 5.

The user interface includes a property editor panel, e.g., map style layer property list 510 of FIG. 5, displaying a plurality of map styles that reference a portion of the electronic map data and a visual map portion, e.g., visual map 230 of FIG. 5, displaying a representation of the electronic map data with the map styles applied. For a selected map style, the server computer 105 executing the mapping application 110 displays 640 in the property editor panel a plurality of style properties and at least one text field for receiving expressions corresponding to a style property. The server computer 105 executing the mapping application 110 receives 650, e.g., via text field 515 of FIG. 5, a portion of an expression to apply to the style property and determines 660, from the library of expressions, a set of suggested expressions corresponding to the style property based on the portion of the expression. The server computer 105 executing the mapping application 110 applies 670 the at least one expression of the set of suggested expressions to the electronic map data for the style property and renders 680 in the visual map portion, e.g., 230 of FIG. 5, an edited representation of the electronic map data for the style property with the received expression applied.

What is claimed is:

1. A computer-implemented method of editing and representing property values for a digital map, comprising:
   storing a library of expressions for styling a digital map, the library of expressions comprising at least one of data field lookup operations, logical operations, mathematical operations, string operations, and color operations;

retrieving electronic map data from a style sheet corresponding to a vector map tile set for the digital map;
displaying a user interface comprising:
- a property editor panel displaying a plurality of map styles that reference a portion of the electronic map data; and
- a visual map portion displaying a representation of the electronic map data with the map styles applied;

for a selected map style, displaying in the property editor panel a plurality of style properties and a text field corresponding to a particular style property of the plurality of style properties for receiving expressions for the particular style property;
receiving, via the text field, a portion of an expression to apply to the style property;
determining, from the library of expressions, a set of suggested expressions corresponding to the style property based on the received portion of the expression;
displaying at least one suggested expression of the set of suggested expressions at the property editor panel;
retrieving inline documentation describing functionality of an expression for at least one suggested expression in the set of suggested expressions;
displaying the retrieved inline documentation adjacent to the set of suggested expressions within the property editor panel;
receiving user selection of a particular suggested expression from the displayed suggested expressions;
applying the particular expression to the electronic map data for the style property; and
rendering in the visual map portion an edited representation of the electronic map data for the style property with the particular expression applied.

2. The computer-implemented method of claim 1, wherein the property editor panel is further configured to display the set of suggested expressions as part of a graphical control element adjacent to the at least one text field.

3. The computer-implemented method of claim 1, wherein the at least one text field is part of the property editor panel.

4. The computer-implemented method of claim 1, wherein the at least one text field is further configured to display an error message responsive to receiving a bad input.

5. The computer-implemented method of claim 1, wherein the property editor panel further comprises an axis user interface.

6. The computer-implemented method of claim 5, wherein the axis user interface is configured to set a range for an expression.

7. The computer-implemented method of claim 6, wherein the range is at least one of a zoom range and data range.

8. The computer-implemented method of claim 1, wherein the text field is configured to define a logical statement.

9. The computer-implemented method of claim 8, wherein the logical statement is a data condition that applies a particular style to non-interpolatable data of the electronic map data.

10. The computer-implemented method of claim 1, further comprising:
receiving enablement of a fallback mode; and
responsive to enablement of the fallback mode and to receiving user selection of a particular suggested expression from the displayed suggested expressions, requesting a confirmation action;
wherein applying the particular expression to the electronic map data for the style property is responsive to enablement of the fallback mode and receiving the confirmation action.

11. A non-transitory computer-readable storage medium storing computer program instructions executable by a processor to perform operations of editing and representing property values for a digital map, the operations comprising:
storing a library of expressions for styling a digital map, the library of expressions comprising at least one of data field lookup operations, logical operations, mathematical operations, string operations, and color operations;
retrieving electronic map data from a style sheet corresponding to a vector map tile set for the digital map;
displaying a user interface comprising:
- a property editor panel displaying a plurality of map styles that reference a portion of the electronic map data; and
- a visual map portion displaying a representation of the electronic map data with the map styles applied;

for a selected map style, displaying in the property editor panel a plurality of style properties and a text field corresponding to a particular style property of the plurality of style properties for receiving expressions for the particular style property;
receiving, via the text field, a portion of an expression to apply to the style property;
determining, from the library of expressions, a set of suggested expressions corresponding to the style property based on the received portion of the expression;
displaying at least one suggested expression of the set of suggested expressions at the property editor panel;
retrieving inline documentation describing functionality of an expression for at least one suggested expression in the set of suggested expressions;
displaying the retrieved inline documentation adjacent to the set of suggested expressions within the property editor panel;
receiving user selection of a particular suggested expression from the displayed suggested expressions;
applying the particular expression to the electronic map data for the style property; and
rendering in the visual map portion an edited representation of the electronic map data for the style property with the particular expression applied.

12. The non-transitory computer-readable storage medium of claim 11, wherein the property editor panel is further configured to display the set of suggested expressions as part of a graphical control element adjacent to the at least one text field.

13. The non-transitory computer-readable storage medium of claim 11, wherein the property editor panel further comprises an axis user interface configured to set a range for an expression, the range comprising at least one of a zoom range and a data range.

14. The non-transitory computer-readable storage medium of claim 11, wherein the text field is configured to define a data condition that applies a particular style to non-interpolatable data of the electronic map data.

15. The non-transitory computer-readable storage medium of claim 11, the operations further comprising:
receiving enablement of a fallback mode; and
responsive to enablement of the fallback mode and to receiving user selection of a particular suggested expression from the displayed suggested expressions, requesting a confirmation action;

wherein applying the particular expression to the electronic map data for the style property is responsive to enablement of the fallback mode and receiving the confirmation action.

16. A system, comprising:
- a processor; and
- a non-transitory computer-readable storage medium storing computer program instructions executable by the processor to perform operations of editing and representing property values for a digital map, the operations comprising:
  - storing a library of expressions for styling a digital map, the library of expressions comprising at least one of data field lookup operations, logical operations, mathematical operations, string operations, and color operations;
  - retrieving electronic map data from a style sheet corresponding to a vector map tile set for the digital map;
  - displaying a user interface comprising:
    - a property editor panel displaying a plurality of map styles that reference a portion of the electronic map data; and
    - a visual map portion displaying a representation of the electronic map data with the map styles applied;
  - for a selected map style, displaying in the property editor panel a plurality of style properties and a text field corresponding to a particular style property of the plurality of style properties for receiving expressions for the particular style property;
  - receiving, via the text field, a portion of an expression to apply to the style property;
  - determining, from the library of expressions, a set of suggested expressions corresponding to the style property based on the received portion of the expression;
  - displaying at least one suggested expression of the set of suggested expressions at the property editor panel;
  - retrieving inline documentation describing functionality of an expression for at least one suggested expression in the set of suggested expressions;
  - displaying the retrieved inline documentation adjacent to the set of suggested expressions within the property editor panel;
  - receiving user selection of a particular suggested expression from the displayed suggested expressions;
  - applying the particular expression to the electronic map data for the style property; and
  - rendering in the visual map portion an edited representation of the electronic map data for the style property with the particular expression applied.

17. The system of claim 16, wherein the property editor panel is further configured to display the set of suggested expressions as part of a graphical control element adjacent to the at least one text field.

18. The system of claim 16, wherein the property editor panel further comprises an axis user interface configured to set a range for an expression, the range comprising at least one of a zoom range and a data range.

19. The system of claim 16, wherein the text field is configured to define a data condition that applies a particular style to non-interpolatable data of the electronic map data.

20. The system of claim 16, the operations further comprising:
- receiving enablement of a fallback mode; and
- responsive to enablement of the fallback mode and to receiving user selection of a particular suggested expression from the displayed suggested expressions, requesting a confirmation action;
- wherein applying the particular expression to the electronic map data for the style property is responsive to enablement of the fallback mode and receiving the confirmation action.

* * * * *